Patented June 4, 1940

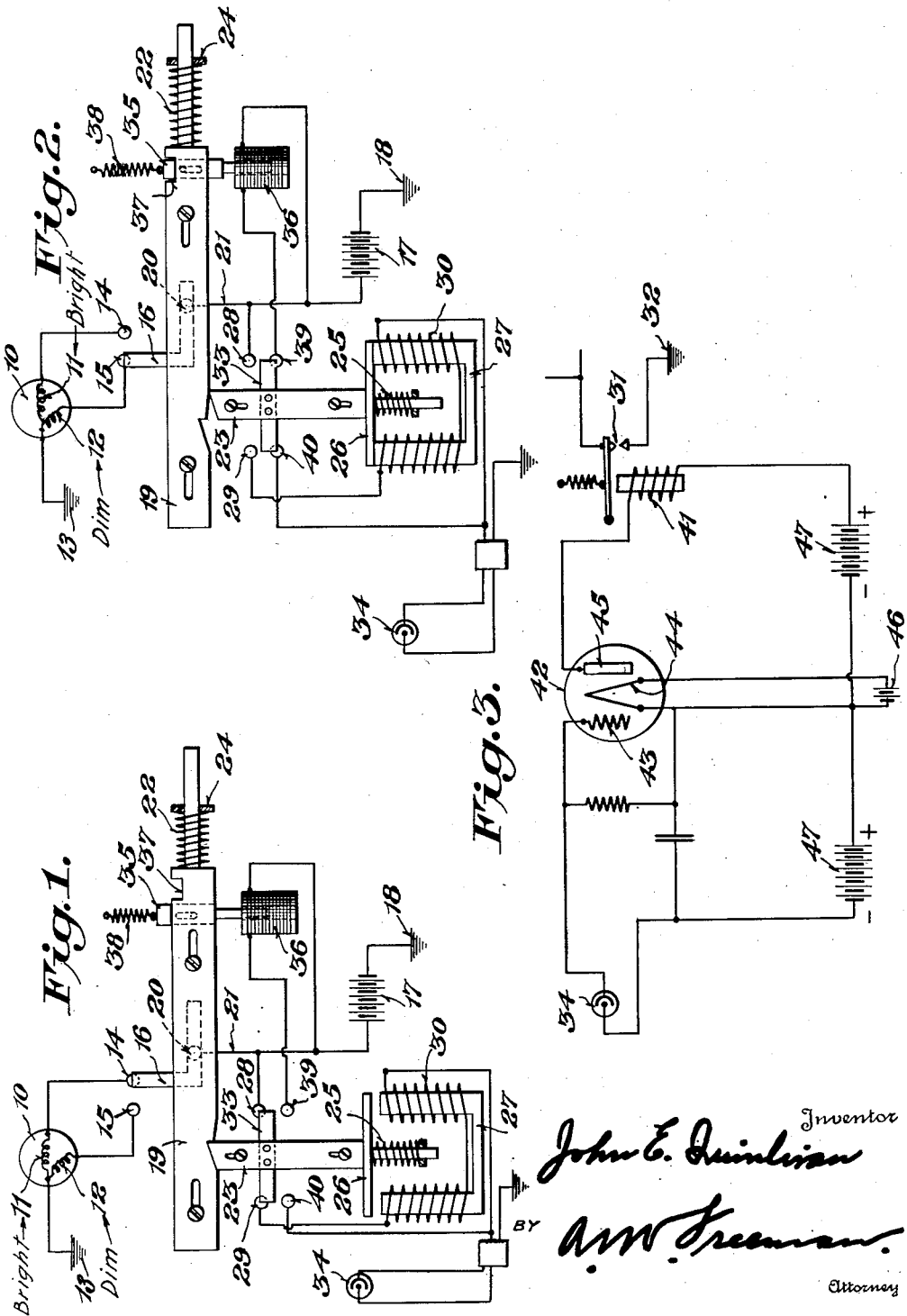

2,202,922

UNITED STATES PATENT OFFICE 2,202,922

ELECTRICALLY OPERABLE CONTROL MECHANISM

John Everett Quinlivan, Sioux Falls, S. Dak., assignor of one-fourth to Gerrit De Young, Sioux Falls, S. Dak.

Application December 3, 1938, Serial No. 243,879

1 Claim. (Cl. 171—97)

This invention relates to an electrically operable control mechanism, and has particular reference to an electrically operable control mechanism including, as its operation initiating means, a photo-electric cell which permits current flow therethrough when subjected to light.

While the invention is capable of a wide variety of uses, it is particularly intended for automatically controlling the dimming of the head lamps of automobiles or other vehicles responsive to the light emitted from the headlamps of approaching automobiles or other vehicles, and in that connection the general object of the invention is to provide a control mechanism which is simple, practical, capable of easy installation on automobiles and other vehicles and which is thoroughly reliable in operation.

According to the invention, a switch element is shiftable between two positions, in one of which it closes a circuit through the "bright" filaments or bulbs of the headlamps and in the other of which it closes a circuit through the "dim" filaments or bulbs of the headlamps. A spring tends constantly to project said switch element to its second mentioned position and a latch is constantly spring pressed toward a position to hold said switch element in its first mentioned or retracted position. The switch element is manually retracted to its first mentioned position in which it is held by the latch, and means is provided for releasing said latch responsive to the subjecting of the photo-electric cell to light. Accordingly, when the "bright" headlamps are in use and the photo-electric cell is subjected to light emitted from the headlamps of an approaching vehicle, the latch is released and the switch element is spring projected to its second mentioned position to cause dimming of the headlamps. The switch element must be manually retracted to its first mentioned position to restore a "bright" headlamp condition. In this connection another and special object of the invention is to provide means whereby the switch element cannot be retracted to its first mentioned position as long as the photo-electric cell is subjected to light, thus to preclude the possibility of the driver of a vehicle using "bright" headlamps so long as an approaching vehicle is in a position in which light from its headlamps affect the photo-electric cell.

With the foregoing and other objects in view, which will become more fully apparent as the nature of the novel combination and arrangement of features as will be hereinafter more fully described, illustrated in the accompanying drawing and defined in the appended claim.

In the accompanying drawing, wherein like characters of reference denote corresponding parts in the different views:

Fig. 1 is a diagrammatic view illustrating the "bright" headlamp status of the parts of the mechanism.

Fig. 2 is a view similar to Fig. 1 illustrating the "dim" headlamp status of the parts of the mechanism, and Fig. 3 is a diagram of an amplifying means employed in conjunction with the photo-electric cell for actuating a switch to initiate operation of the mechanism.

Referring to the drawing in detail, 10 designates a headlamp having a "bright" filament 11 and a "dim" filament 12, both of which are grounded at one side, as indicated at 13, and which, at their other sides, are connected to contacts 14 and 15, respectively.

The contacts 14 and 15 may be located at any suitable point and are suitably spaced apart and have cooperating therewith a contact finger 16 which, in any suitable manner, is constantly connected with one side of a battery 17 the other side of which is grounded as indicated at 18. Accordingly, when the contact finger 16 is engaged with the contact 14 current flows through the "bright" filament 11 of the headlamp 10, and when said contact finger is engaged with the contact 15 current flows through the "dim" filament 12 of the headlamp.

The contact finger 16 is carried by a projectable and retractable switch element 19 and, in the present instance, is constantly slidably engaged with a contact 20 connected by a conductor 21 to the first mentioned side of the battery 17, whereby, when said contact finger is engaged with either of the contacts 14 or 15, a circuit from the battery through the related lamp filament is completed.

The switch element 19 may be mounted for projection and retraction in any suitable manner, and its mounting is such that when it is retracted the contact finger 16 is engaged with the contact 14, and when it is projected said contact finger 16 is engaged with the contact 15.

A spring 22 cooperating with the switch element 19 in any suitable manner tends constantly to project said switch element. On the other hand, a latch 23 cooperating with said switch element in any suitable manner, is effective to hold said switch element retracted against the tendency of the spring 22 to project the same.

In the present instance the spring 22 is in the form of a compression spring interposed between one end of the switch element 19 and a suitable abutment 24. It may, however, be otherwise associated with said switch element and, instead of being a compression spring, it obviously may be a tension spring. Also, in the present instance, the latch 23 is formed at one end to engage in a notch in the switch element 19 and to cooperate with a shoulder of said switch element formed by said notch to hold said switch element retracted. Obviously, however, the specific arrangement in this respect is immaterial and any equivalent of the arrangement shown may be employed.

A spring 25 of any suitable type cooperates in any suitable manner with the latch 23 to urge the same constantly in a direction for holding cooperation with the switch element 19. Accordingly, whenever the latch 23 is released and the switch element 19 is projected and subsequently is manually retracted, said latch 23 operates to releasably hold said switch element in its retracted position.

An armature 26 is carried by the latch 23 and a suitable electro-magnet 27 is provided for cooperation with said armature, the arrangement in this respect being such that when said electro-magnet is energized the same operates through the armature 26 to retract the latch 23 and effect its release, thereby to release the switch element 19 for projection by the spring 22. Of course, when the electro-magnet 27 is deenergized, the spring 25 is free to project the latch 23 in a direction to latch the switch element 19 in its retracted position upon manual retraction of the same.

Mounted adjacent the latch 23 are companion contacts 28 and 29, the former of which is connected with the battery 17, in the present instance through the conductor 21, and the latter of which is connected with one end of the winding 30 of the electro-magnet 27. The other end of the winding 30 is connected to one side of a normally open switch 31 the other side of which is grounded as indicated at 32 (Fig. 3). Moreover, a switch arm 33 is carried by the latch 23 in a position to bridge the contacts 28, 29 when said latch 23 is in its projected position holding the switch element 19 retracted. Accordingly, upon closing of the switch 31 a circuit through the electro-magnet 27 is closed, the same is energized and the latch 23 is retracted, thereby releasing the switch element 19 for projection. Upon retraction of the latch 23 the switch arm 33 becomes disengaged from the contacts 28, 29, thereby opening the electro-magnet circuit, but before this occurs the switch element 19 is projected and the circuit through the "dim" filament 12 of the lamp 10 is closed. Of course, upon opening of the circuit of the electro-magnet 27, the spring 25 becomes effective to project the latch 23 so that when the switch element 19 subsequently is manually retracted it is held retracted.

Closing of the switch 31 is under the control of a photo-electric cell designated generally as 34. This cell may be mounted at any suitable point on the vehicle so that it is exposed to the light of the headlamps of an approaching vehicle. Accordingly, assuming a retracted status of the switch element 19 and a consequent "bright" light status of the headlamp 10 as shown in Fig. 1, it is manifest that upon the approach of a vehicle and subjecting of the photo-electric cell 34 to the light of the headlamps of the approaching vehicle, the switch 31 will close, the latch 23 will be retracted, thereby releasing the switch element 19, and the latter will be projected with consequent "dimming" of the headlamp 10.

Means is provided whereby, once the switch element 19 has been projected, it cannot be retracted so long as the switch 31 remains closed due to continued subjectance of the photo-electric cell 34 to light. This is for the purpose of precluding the use of the "bright" headlamps in lighted areas or, for example, while the vehicle is passing a succession of approaching vehicles on a highway.

The means referred to comprises a latch element 35 mounted for movement by a solenoid 36 into a notch 37 in the switch element 19 when said switch element is projected; a spring 38 tending constantly to move said latch element out of said notch to release the switch element 19 for retraction, and switch means comprising companion contacts 39 and 40 positioned to be bridged by the switch arm 33 when the latch 23 is retracted.

The contact 39 is connected to one end of the winding of the solenoid 36; the other end of the winding of said solenoid is connected to the battery 17, and the contact 40 is connected to one side of the switch 31. Thus, upon retraction of latch 23 and projection of switch element 19, switch arm 33 acts as a contacting element between contacts 40 and 39, which causes the electro-magnet 36 to be energized and magnet 27 to be deenergized, the switch arm 23 thereby is maintained in bridging relationship to the contacts 39, 40, the solenoid 36 consequently is maintained energized and the latch element 35 is maintained in the notch 37 locking the switch element 19 against retraction. Of course, as soon as the switch 31 opens, the electro-magnet 36 is deenergized, with the result that the spring 38 retracts the latch element 35 from the notch 37. The switch element 19 then is free for manual retraction.

An electro-magnet 41 is employed for closing the switch 31, and in order that the photo-electric cell 34 may operate to cause a sufficiently strong current to flow through said electro-magnet 41 to close said switch 31, an amplifying circuit including a vacuum tube 42 is employed between said photo-electric cell and said switch 31. One side of the photo-electric cell is connected with the grid 43 of said tube; the other side of said cell is connected with one side of the filament 44 of said tube and with one end of the winding of the electro-magnet 41 and the other end of the winding of said electro-magnet is connected to the plate 45 of the tube 42. A battery 46 supplies current to the filament 44 of the vacuum tube 42 and a battery, or batteries 47 in the circuit of the electro-magnet 41 furnish current for energizing said electro-magnet. When the photo-electric cell is subjected to light it permits the passage of a small current which, acting through the vacuum tube 42 in a known manner, causes a sufficiently strong current flow through the electro-magnet 41 to close the switch 21.

From the foregoing description considered in connection with the acompanying drawing, it is believed that the construction, operation and advantages of the invention, whether used for the purpose of controlling the dimming of automobile headlamps or for an analogous purpose, will be clearly understood. Further, it is believed to be manifest that while only a single, specific embodiment of the invention has been illustrated and described, the same is readily capable of various modifications and of embodiment in various specifically different forms within its spirit and scope as defined in the appended claim.

I claim:

An electric control system for dimming headlights, comprising, headlamps having bright and dim terminals, a source of current, a photo-electric cell, a two position switch for connecting the source to the dim terminals when in a first position and to the bright terminals when in second position, yieldable means for biasing the switch to the first position, manually operable means for moving the switch to the second position, a latch for holding the switch in the second position, electrically operated locking means for maintaining the switch in the first position when energized, means operated by the photo-electric cell by the presence of light thereon for retracting said latch thereby permitting the switch to be operated to the first position by said yieldable means from the second position, and means operative while the switch is in the first position for switching the control by said photo-electric cell to said locking means to effect the locking of the switch in the first position as long as said photo-electric cell is influenced by light thereon.

JOHN EVERETT QUINLIVAN.